Inventor:
C. R. Hilpert
By: James E. Nilles
Attorney

Inventor:
C. R. Hilpert
By: James E. Nilles
Attorney.

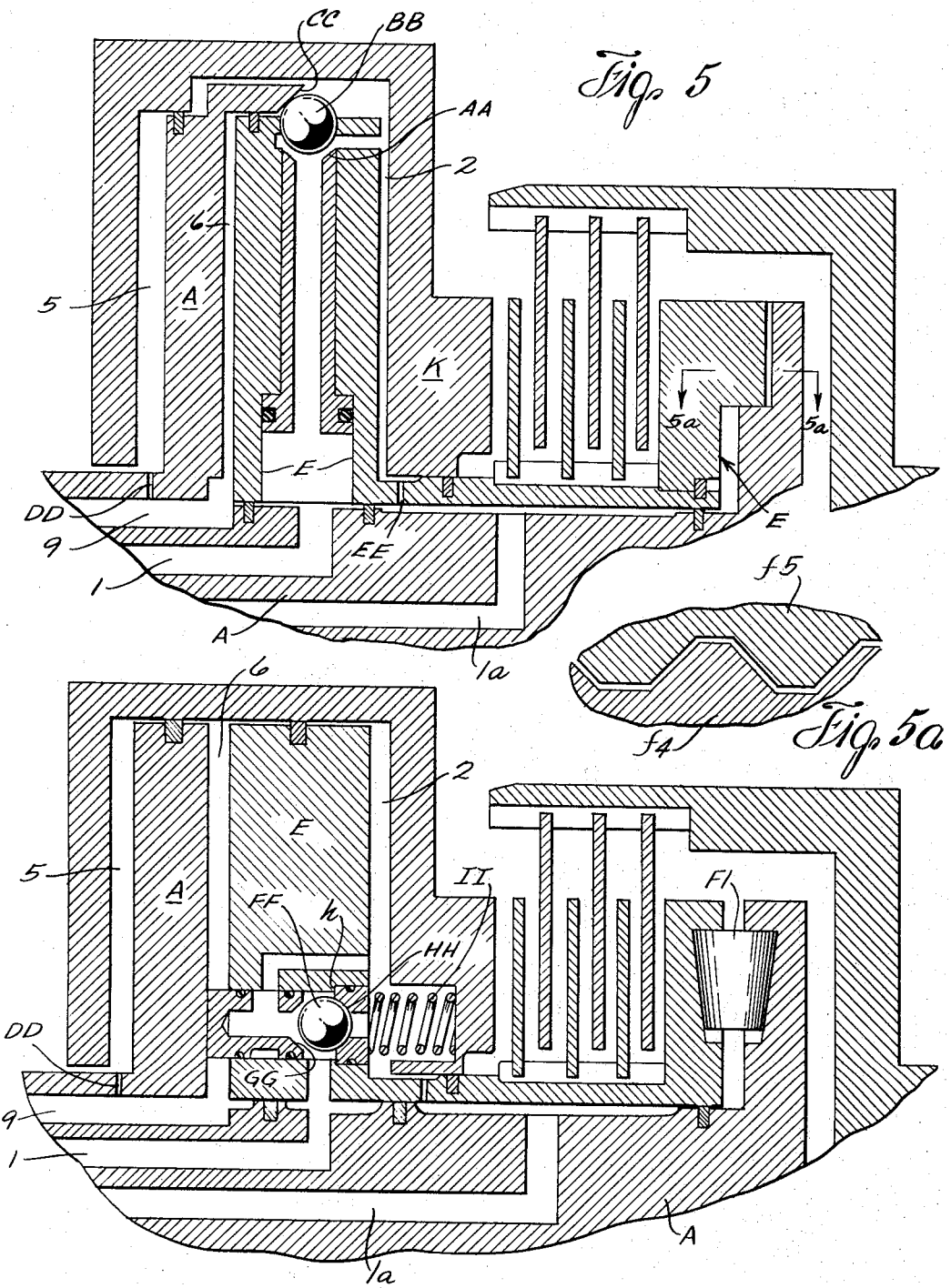

United States Patent Office 3,360,087
Patented Dec. 26, 1967

3,360,087
HYDRAULICALLY ACTUATED FRICTION CLUTCH HAVING TORQUE CONTROL MEANS
Conrad R. Hilpert, Winnebago, Ill., assignor to Twin Disc, Incorporated, a corporation of Wisconsin
Filed June 6, 1966, Ser. No. 555,460
10 Claims. (Cl. 192—56)

This invention relates generally to hydraulically actuated, friction clutches, and more particularly to means for controlling the output torque regardless of the changing coefficient of friction within the clutch.

During operation of a friction clutch, the coefficient of friction of the clutch surfaces changes considerably. For example, during the engaging cycle of a friction clutch, the coefficient of friction may increase five times. As a result, the downstream machinery may be subjected to five times as much torque as originally intended. This is a particularly troublesome problem where the clutch follows a torque converter and a very accurate limit on the control of the torque is required.

In accordance with the present invention, a hydraulically actuated friction clutch is provided, having control means for precisely controlling or limiting the torque output. More specifically, the output torque characteristic of the improved clutch will be a linear function of the clutch control pressure; a constant external clutch apply pressure will produce a constant torque regardless of the coefficient of friction of the clutch.

Generally, the present invention provides a hydraulically actuated, friction clutch of the torque sensitive type wherein the clutch control means is a function of or related to transmitted, output, torque.

Another more specific object of the present invention is to provide a torque sensitive clutch of the above type, and having means for varying the limits of the clutch, that is to say, the output torque is readily adjustable. This aspect of the invention contemplates the use of a separate source of control pressure fluid and a "torque set" chamber by means of which the transmitted torque will be a function of the control pressure.

These and other objects and advantages of the present invention will appear hereinafter as this disclosure progresses, reference being had to the accompanying drawings in which:

FIGURES 3 to 6 are views similar to FIGURE 2 but are each modifications of the invention;

FIGURE 5a is a sectional view taken along line 5a—5a in FIGURE 5.

Figure 1:
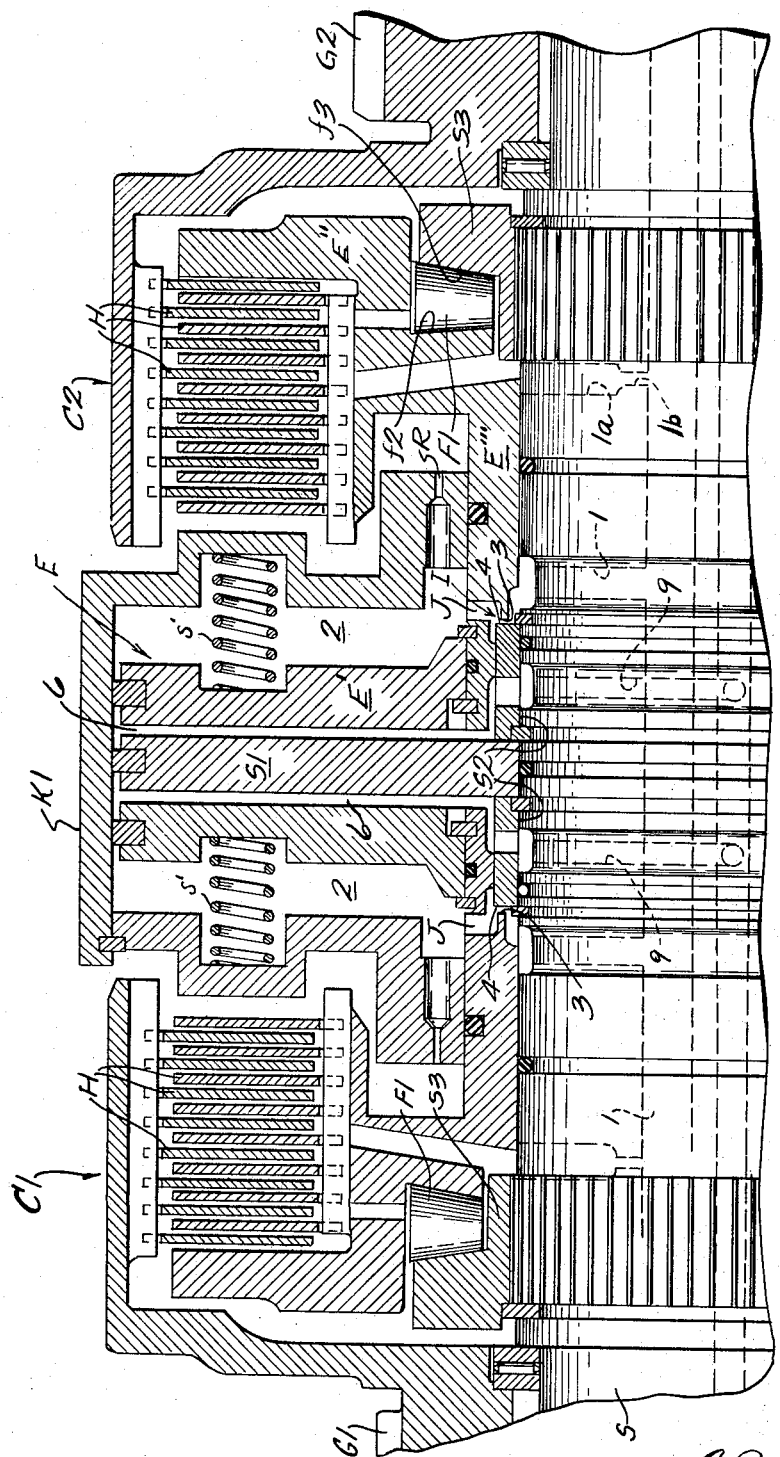
FIGURE 1 is a longitudinal, fragmentary, cross sectional view of a dual clutch embodying the present invention.

*Figure 1*

Referring in greater detail to the drawings, FIGURE 1 shows one form of the invention as applied to a dual clutch arrangement wherein a pair of clutches C1 and C2 are mounted on shaft S, one on each side of an annular piston K1. A central, fixed reaction member S1 is rigidly fixed to shaft S and annular rings S2 are also fixed to shaft S and define a shoulder 4 for a purpose that will appear.

As the clutches C1 and C2 are similar, only one will be described, it being understood that when clutch C1 is engaged, power is transmitted between shaft S and gear member G1 rotatably and freely mounted on shaft S, and engagement of clutch C2 permits transmission of power between shaft S and gear member G2 which is mounted for rotation on and independent of shaft S, in the known manner.

Turning now to a more complete description of one of the clutches C2 and its associated parts, a carrier E is slidably mounted in an axial direction on shaft S and is also rotatably in respect thereto. Carrier E has radial flanges or end walls E' and E'' and a central portion E''' therebetween. The right (as viewed in FIGURE 1) side wall of piston K1 is in sliding, sealing engagement with the central portion E''' of carrier E and has a venting port R extending therethrough. The wall of piston K1 is abuttable against the interleaved friction plates H to engage the clutch by compressing or clamping up the plates in the known manner.

Carrier E has a radial shoulder 3 and holes J therethrough for a purpose which will appear.

The piston K1 together with carrier E and the fixed reaction member S1 form a pair of expansible, pressure fluid chambers 2 and 6.

Chamber 2 is the clutch actuating chamber while chamber 6 is a hydraulically actuated torque setting chamber, as will appear. Chamber 6 may be considered a resilient means for urging carrier E to a valve open position whereby the maximum torque transmitted by the clutch is preset by this resilient means.

Fluid passage 1 in shaft S conducts pressure fluid from a source (not shown), through an annular valve I formed by shoulder 3 of the carrier and shoulder 4 of the fixed ring member S2, through holes J and into chamber 2. Passage 1 also supplies cooling fluid through orifice 1b and via passage 1a to the friction plates in the conventional manner, as shown. Fluid passage 9 is a separate and independent fluid supply passage for the torque setting chamber 6 and by means of which the pressure in chamber 6 is adjustable to thereby set a corresponding torque which will be delivered by the clutch, as will appear.

Torque measuring means are provided between the carrier E and shafts S which urge them axially apart upon relative rotation therebetween. This means may be of various forms but takes the form in FIGURE 1 of a plurality of circumferentially spaced rollers F1 which act against the circumferentially inclined, cam surfaces f2 and f3 of members E and S3, respectively. Member S3 may be considered as an integral part of shaft S to which it is fixed by a conventional spline connection as shown.

When relative rotation occurs between shaft S and carrier E, the torque measuring means F1 and cam surfaces f2 and f3 act to urge the carrier E to the left (as viewed in FIGURE 1) thus causing shoulders 3 and 4 to abut, closing valve I. That is to say, valve I closes if the pressure setting in the torque setting chamber 6 is not sufficiently high to prevent valve closing. Closing of valve I shuts off pressure fluid to chamber 2 and orifice R permits a pressure drop in chamber 2, reducing the clutch clamp up pressure and causes slipping of the clutch. Release springs s' urge the piston to a neutral position. Eventually the pressure setting in chamber 6 overcomes the torque sensing of the roller F1, and carrier E shifts to the right, opening valve I. This again causes increase in clutch clamp-up pressure in chamber 2. Thus the clutch balances itself as determined by the adjustable torque setting pressure in chamber 6.

Figures 2, 2A:
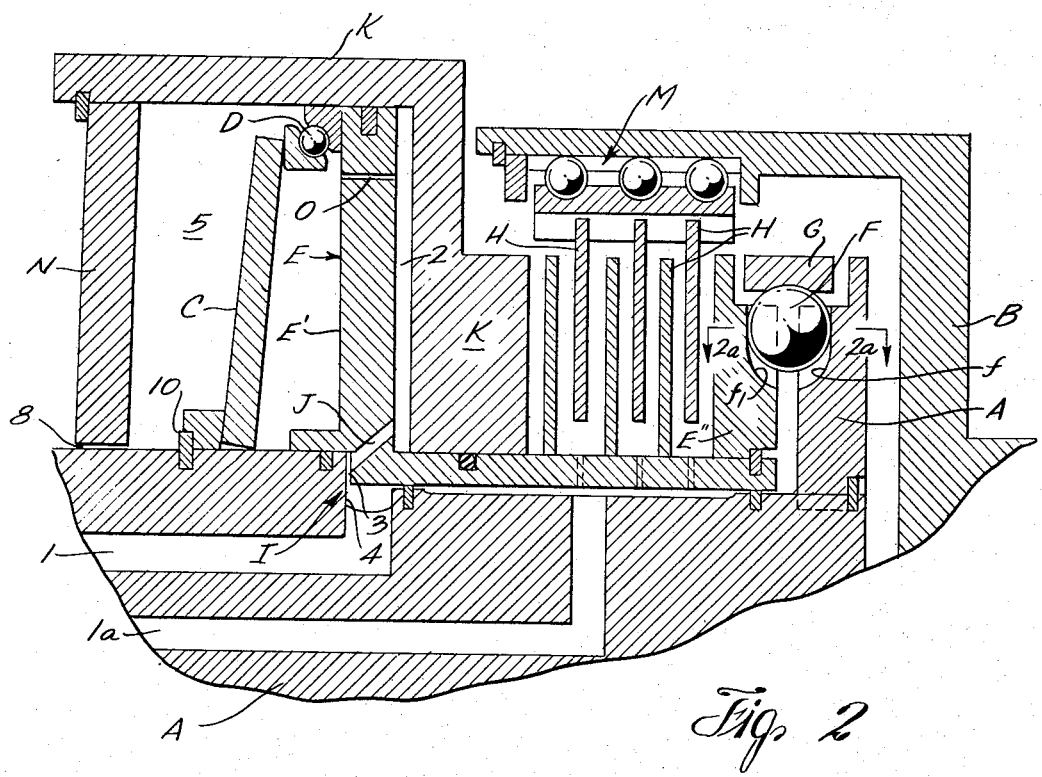
FIGURE 2 is a schematic, fragmentary, longitudinal, cross sectional view of a clutch embodying a modification of the present invention.
FIGURE 2a is a cross sectional view taken along lines 2a—2a in FIGURE 2.

*Figure 2*

For purposes of describing this modification of the invention, assume shaft A is the output or driven shaft while shaft B is the power input or driving member, although the direction of power flow could be reversed.

The clutch shown in FIGURE 2 has a fixed, preset maximum torque at which it will slip regardless of its coefficient of friction.

Means are again provided for setting the maximum torque to be transmitted, and this means in FIGURE 2 takes the form of a preloaded Belleville spring washer C which is held on shaft A by snap ring 10 and also bears against the anti-friction bearing assembly D. Spring C applies a load through assembly D and to a carrier E which in turn presses against the torque measuring means, which takes the form of balls F in angular ramps $f$ and $f1$ in members E and A respectively.

The balls and grooves form a camming arrangement whereby relative rotation between members A and E causes the balls to ride up on the inclined ramps of the grooves urging the members A and E axially apart in the known manner. Here again carrier E is rotatable on and independently relative to shaft A. Thus, axial movement of carrier E to the left (as viewed in the drawings) pushes spring C with an axial force which is proportional to the torque, geometry of the cam surfaces and moment arm from the clutch centerline.

Ring G simply retains the balls in place, that is, against radial outward movement. Other forms of camming devices could also be used, such as the rollers F1 shown in FIGURES 1 or 6, or fixed cams in FIGURE 5.

As in FIGURE 1, an annular valve I is formed by a shoulder 3 of carrier E and a shoulder 4 of shaft A. The valve is shown in the open position, and is closed when the shoulders abut against one another.

Interleaved clutch plates H are splined in the known manner to member B and carrier E and, as in FIGURE 1, form a disengageable driving connection therebetween.

An axially shiftable piston K is abuttable against the clutch plates to compress them when pressure fluid is admitted via passage 1 in shaft A, valve I, holes J in carrier E and into the expansible fluid chamber 2 formed by the piston and the radial wall E′ of carrier E.

Orifice O permits bleeding of the chamber 2 to atmosphere.

Means may also be provided for insuring complete freedom of axial movement to the clutch plates H as member E moves axially. This means takes the form of a ball spline connection M, but it may not be necessary in many situations and is not shown in all the views.

As in FIGURE 1, conventional means for cooling the plates may also be provided in the form of separate fluid passage 1a, as shown in FIGURE 2, but this means is not shown in the other views.

*Operation*

The operation is as follows. The Belleville spring C is pre-loaded to the torque at which the torque measuring balls F and their cams move relatively to shift carrier E and compress spring C. This closes valve I, shutting off the pressure fluid to chamber 2. The orifice O causes pressure drop in chamber 2 and reduces the clutch clamp-up force on the plates, causing the clutch to slip. Eventually spring C again overcomes the torque setting of the balls and ramps, thus opening valve I and increasing clamping pressure in chamber 2. Thus the clutch balances itself at the predetermined torque setting, that is, the spring preload sets the torque at which valve I shuts off the clutch.

Under some circumstances, particularly at higher speeds, in order to obtain more rapid response, it may be desirable to provide a balance piston N to compensate for or counter the centrifugal head of the fluid in chamber 2 and fluid is supplied to the balance chamber 5 by orifice O. Chamber 5 is vented to atmosphere by clearance 8. This arrangement permits instantaneous control of pressure in chamber 2 and consequently the clamp force on the clutch plates by valve I at all rotational speeds.

Figure 3:
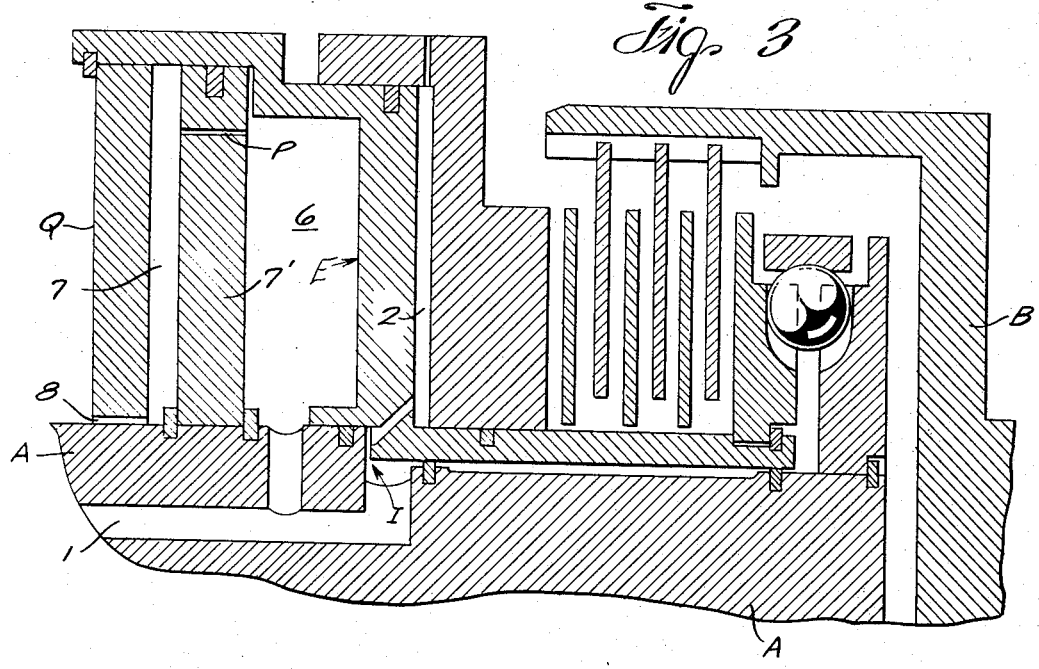

*Figure 3*

As shown in FIGURE 3, in place of using a Belleville spring C as a preloading means, a piston chamber 6 is provided which is open to the fluid supply passage 1. The axial force which sets the maximum torque that closes valve I is thus externally controlled. Balance chamber 7 is fed by orifice P in an axially fixed member 7′. Balance chamber 7 is held at atmospheric pressure by clearance 8 between end wall Q and shaft A. Thus when pressure in line 1 is low, the torque required to close valve I will be low, and thus a low maximum torque is set. Raising the supply pressure in passage 1 will correspondingly raise the maximum torque setting.

Figure 4:
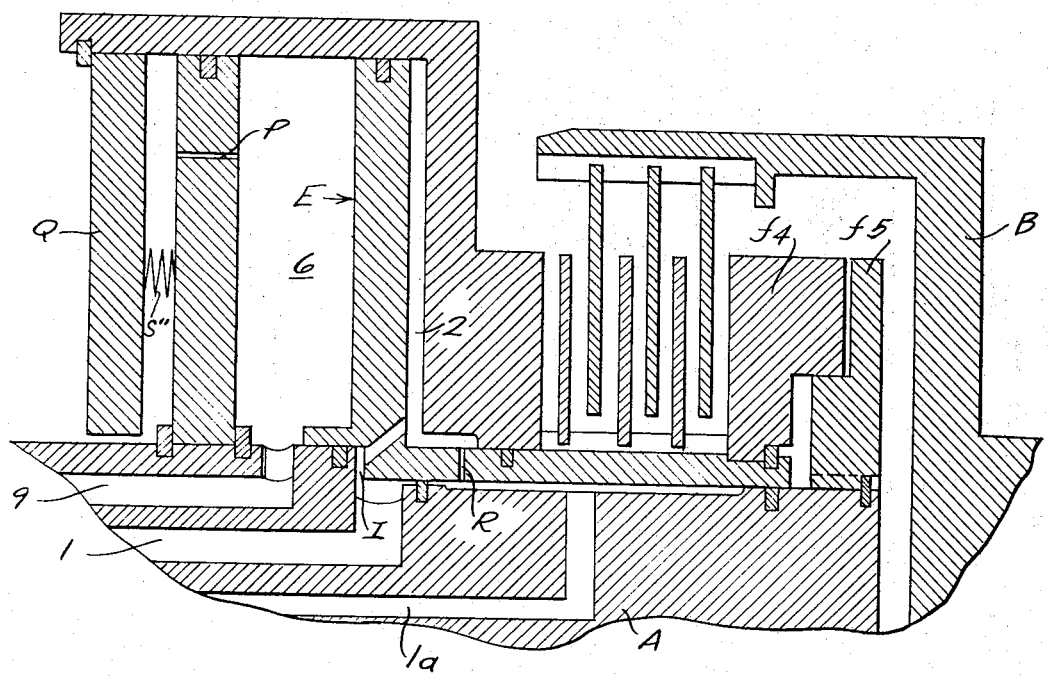

*Figure 4*

The arrangement shown in FIGURE 4 is generally the same as that shown in FIGURE 3, except that a separate and independent fluid supply passage 9 is provided for chamber 6. High pressure is continuously supplied in passage 1 which attempts to engage the clutch but cannot if there is no pressure in chamber 6 because any torque transmitted will close valve I, thus removing apply pressure at chamber 2. As indicated, the operator controlled pressure in chamber 6 will set the torque where valve I will regulate, and as a result the transmitted torque will be a function of the control pressure in chamber 6, and not a function of the coefficient of friction or of the pressure in supply passage 1. This arrangement provides variable limits for the maximum torque setting. In other words, it is possible to adjustably set the pressure for which a corresponding torque will be delivered. If no pressure exists in chamber 6, no torque will be delivered as the valve I will be closed. Pressurizing chamber 6 will result in torque transmission.

Also in FIGURE 4, the balance pistons are arranged so that all piston areas except that of annular valve I are balanced against centrifugal pressure. Apply chamber 2 is constantly bled via orifice R. Spring $s″$ is optional, but may completely disengage the clutch when pressure in passage 1 is at a minimum.

The torque sensing means of FIGURE 4 are simply opposed cam surfaces $f4$ and $f5$.

*Figure 5*

This arrangement is generally similar to the above described clutches except that a different type of valve is provided which is positive in operation. Parts similar to above described parts have been correspondingly referenced. The torque sensing means in the FIGURE 5 device, as in the FIGURE 4 device, does not utilize the roller means F1 or F but simply the opposed cam surfaces $f4$ and $f5$ which urge the carrier and member A axially apart upon relative rotation therebetween.

Chamber 6 is again the "torque setting" chamber and the ball BB is forced toward the centerline when the carrier E shifts to the left (as viewed in FIGURE 5) when the torque exceeds the reaction of pressure in chamber 6. Stated otherwise, excess torque causes carrier E to move to the left, relative to member A, and camming slope CC forces ball BB inwardly. The ball valve BB seals against valve seat AA thus sealing off the supply passage 1 from apply chamber 2.

Ball seat AA is held in its outward position by centrifugal force and pressure in passage 1. Continued movement of carrier E (to the left as viewed in the drawings) relative to member A will cause ball BB to push seat AA toward the clutch centerline until carrier E abuts against member A. Thus camming surface CC, ball BB and seat AA are not subject to excessive forces. Orifice DD keeps the balance chamber 5 supplied with fluid. Orifice EE vents the clutch apply chamber 2, allowing ball BB to control the pressure in chamber 2.

*Figure 6*

FIGURE 6 shows a device using an axially moving ball FF, instead of a radially moving one as in FIGURE 5. The movement of carrier E towards the left (as viewed in the drawing) causes ball seat GG to approach ball seat HH, thus flow from 1 to 2 is restricted or finally stopped. Ball FF is in a balanced condition because both of its seats are at the pressure in chamber 2. Pressure in passage 1 maintains GG in contact with member A and spring II maintains valve seat HH against its shoulder *h* in carrier E unless carrier E moves excessively towards member A, then seats GG and HH and ball FF are prevented from being overloaded by spring II. FIGURE 6 also shows a tapered roller, previously mentioned, in place of the torque sensing balls of the other figures. The use of a roller only allows increased capacity.

Résumé

The present invention provides a hydraulically actuated friction clutch having means for controlling the output torque regardless of the value of the coefficient of the friction within the clutch. The torque output can be readily adjustable, if desired, and the control pressure can produce and accurately control the desired torque output.

Various modes of carrying out the invention are contemplated as being within the scope of the following claims particularly pointing out and distinctly claiming the subject matter which is regarded as the invention.

What is claimed is:

1. A hydraulically actuated friction clutch having input and output members a carrier rotatably and axially shiftably mounted on one of said members, torque measuring means between said one member and said carrier and adapted to measure torque by relative rotation therebetween, interleaved friction plates between the other member and said carrier and forming a disengageable friction clutch connection therebetween, an axially shiftable piston mounted on said carrier for rotational and axial shifting relative thereto and abuttable against said plates to cause clamp-up of said plates; said piston and carrier defining an expansible fluid, clutch actuating chamber, passage means for supplying pressure fluid to said chamber to cause expansion thereof and consequent axial shifting of said piston and clamp-up of said plates, valve means in said passage means and actuated by axial shifting of said carrier, and resilient means for urging said carrier to a valve open position, whereby the maximum torque transmitted by said clutch is preset by said resilient means and is sensed by said torque measuring means and transmitted to said resilient means via said carrier.

2. A clutch as defined in claim 1 further characterized in that said resilient means is a preloaded spring.

3. A clutch as defined in claim 1 further characterized in that said resilient means is hydraulically actuated and includes an expansible fluid torque setting chamber.

4. A clutch a defined in claim 3 further characterized in that a single pressure fluid supply is provided for both said torque setting chamber and said clutch actuating chamber.

5. A clutch as defined in claim 3 further characterized in that separate fluid supply passages are provided for the torque setting chamber and said clutch actuating chamber whereby the torque output of said clutch can be independently varied by varying the fluid pressure in said torque setting chamber.

6. A clutch as defined in claim 1 wherein said valve means includes a valve seat on said carrier and a shiftable ball seatable on said seat and shiftable by movement of said carrier.

7. A clutch as defined in claim 1 further characterized in that said valve means is defined in part by said carrier.

8. A clutch as defined in claim 1 further characterized in that said torque measuring means includes opposed cam surfaces on said carrier and said one member for urging said carrier and said one member apart in an axial direction upon relative rotation therebetween.

9. A clutch as defined in claim 2 further characterized in that said torque measuring means includes opposed cam surfaces on said carrier and said one member for urging said carrier and said one member apart in an axial direction upon relative rotation therebetween.

10. A clutch as defined in claim 7 further characterized in that said torque measuring means includes opposed cam surfaces on said carrier and said one member for urging said carrier and said one member apart in an axial direction upon relative rotation therebetween.

References Cited
UNITED STATES PATENTS

| | | | |
|---|---|---|---|
| 2,642,971 | 6/1953 | Hagenbook | 192—56 |
| 2,781,871 | 2/1957 | Altekruse | 192—56 X |
| 2,963,134 | 12/1960 | Banner | 192—56 |
| 3,237,734 | 1/1966 | Jania | 192—56 X |

CARLTON R. CROYLE, *Primary Examiner.*

BENJAMIN W. WYCHE, *Examiner.*